(12) United States Patent
Paterson et al.

(10) Patent No.: US 11,120,056 B2
(45) Date of Patent: Sep. 14, 2021

(54) SYSTEMS AND METHODS FOR SHARING DOCUMENTS

(71) Applicant: FutureVault Inc., Toronto (CA)

(72) Inventors: Gordon Scott Paterson, Toronto (CA); Michael Bradley, Toronto (CA); Brad Rosenberg, Toronto (CA); Ka Fu Ko, Mississauga (CA)

(73) Assignee: FutureVault Inc., Toronto (CA)

( * ) Notice: Subject to any disclaimer, the term of this patent is extended or adjusted under 35 U.S.C. 154(b) by 316 days.

(21) Appl. No.: 15/690,760

(22) Filed: Aug. 30, 2017

(65) Prior Publication Data

US 2018/0068010 A1 Mar. 8, 2018

Related U.S. Application Data

(60) Provisional application No. 62/383,301, filed on Sep. 2, 2016.

(51) Int. Cl.
*G06F 16/00* (2019.01)
*G06F 16/28* (2019.01)
(Continued)

(52) U.S. Cl.
CPC .......... *G06F 16/288* (2019.01); *G06F 16/176* (2019.01); *G06F 16/93* (2019.01); *H04L 9/32* (2013.01)

(58) Field of Classification Search
CPC ...... G06F 9/468; G06F 16/176; G06F 16/288; G06F 16/93; G06F 21/10; G06F 21/62;
(Continued)

(56) References Cited

U.S. PATENT DOCUMENTS

| 5,553,145 A | 9/1996 | Micali |
| 5,629,982 A | 5/1997 | Micali |

(Continued)

FOREIGN PATENT DOCUMENTS

| CA | 2545940 C | 5/2005 |
| WO | 2014018614 A2 | 1/2014 |

OTHER PUBLICATIONS

US 9,026,197 B2, 05/2015, Cohen et al. (withdrawn)
(Continued)

*Primary Examiner* — Diedra McQuitery
(74) *Attorney, Agent, or Firm* — Bereskin & Parr LLP/S.E.N.C.R.L., s.r.l.

(57) ABSTRACT

Methods and systems for sharing electronic documents are described herein. The example method includes storing the electronic documents in a relational database storage; storing entity identifiers in the relational database storage, each entity identifier representing an entity type; recording in a non-relational database storage associations between the electronic documents and at least one entity identifier, each association comprising a relationship between a set of electronic documents and the at least one entity identifier; associating a delegate account with the at least one entity identifier; and based on an association recorded in the non-relational database storage for the at least one entity identifier, granting the delegate account a subset of document management functions available for the set of documents.

20 Claims, 8 Drawing Sheets

(51) Int. Cl.
*G06F 16/93* (2019.01)
*G06F 16/176* (2019.01)
*H04L 9/32* (2006.01)

(58) Field of Classification Search
CPC .............. G06F 21/6209; G06F 21/6218; G06F 2221/2141; G06F 2221/2145
See application file for complete search history.

(56) References Cited

U.S. PATENT DOCUMENTS

| | | | |
|---|---|---|---|
| 5,689,705 A | 11/1997 | Fino et al. |
| 5,991,769 A | 11/1999 | Fino et al. |
| 6,137,884 A | 10/2000 | Micali |
| 6,289,406 B1 | 9/2001 | Chambers et al. |
| 6,289,460 B1 | 9/2001 | Hajmiragha |
| 6,457,062 B1 | 9/2002 | Pivowar et al. |
| 6,539,401 B1 | 3/2003 | Fino et al. |
| 6,658,147 B2 | 12/2003 | Gorbatov et al. |
| 6,876,766 B2 | 4/2005 | Gorbatov et al. |
| 6,944,648 B2 | 9/2005 | Cochran et al. |
| 7,031,526 B2 | 4/2006 | Gorbatov et al. |
| 7,054,758 B2 | 5/2006 | Gill-Garrison et al. |
| 7,174,043 B2 | 2/2007 | Lossev et al. |
| 7,231,595 B1 | 6/2007 | Fujino et al. |
| 7,254,035 B2 | 8/2007 | Sasaki et al. |
| 7,382,921 B2 | 6/2008 | Lossev et al. |
| 7,437,003 B1 | 10/2008 | Gorbatov et al. |
| 7,450,763 B2 | 11/2008 | Gorbatov et al. |
| 7,685,506 B2 | 3/2010 | Fino et al. |
| 7,783,594 B1 | 8/2010 | Pachikov |
| 7,812,682 B2 | 10/2010 | Boroditsky et al. |
| 8,014,630 B1 | 9/2011 | Polyakov et al. |
| 8,072,273 B2 | 12/2011 | Boroditsky et al. |
| 8,239,496 B2 | 8/2012 | Peterson et al. |
| 8,286,199 B1 | 10/2012 | Pulaski et al. |
| 8,290,228 B2 | 10/2012 | Cohen et al. |
| 8,311,938 B2 | 11/2012 | Shivers et al. |
| 8,463,007 B2 | 6/2013 | Steinberg et al. |
| 8,504,519 B1 | 8/2013 | Sachs et al. |
| 8,542,900 B2 | 9/2013 | Tolkowsky et al. |
| 8,655,961 B2 | 2/2014 | McCabe et al. |
| 8,670,603 B2 | 3/2014 | Tolkowsky et al. |
| 8,693,756 B2 | 4/2014 | Tolkowsky et al. |
| 8,781,193 B2 | 7/2014 | Steinberg et al. |
| 8,838,980 B2 | 9/2014 | Gonser et al. |
| 8,855,744 B2 | 10/2014 | Tolkowsky et al. |
| 8,862,575 B2 | 10/2014 | Shivers et al. |
| 8,880,597 B1 | 11/2014 | Pachikov et al. |
| 8,910,258 B2 | 12/2014 | Gonser et al. |
| 8,949,706 B2 | 2/2015 | McCabe et al. |
| 8,949,708 B2 | 2/2015 | Peterson et al. |
| 8,953,228 B1 | 2/2015 | Mehers |
| 8,996,457 B2 | 3/2015 | Sachs et al. |
| 9,007,390 B2 | 4/2015 | Lang et al. |
| 9,008,367 B2 | 4/2015 | Tolkowsky et al. |
| 9,008,754 B2 | 4/2015 | Steinberg et al. |
| 9,014,453 B2 | 4/2015 | Steinberg et al. |
| 9,144,394 B2 | 5/2015 | Cohen et al. |
| 9,053,165 B2 | 6/2015 | van Rossum |
| 9,075,898 B1 | 7/2015 | Ayzenshtat et al. |
| 9,101,286 B2 | 8/2015 | Tolkowsky et al. |
| 9,129,095 B1 | 9/2015 | Lm et al. |
| 9,147,131 B2 | 9/2015 | Libin |
| 9,152,730 B2 | 10/2015 | Bignert et al. |
| 9,171,132 B1 | 10/2015 | Pachikov et al. |
| 9,171,203 B2 | 10/2015 | Chajed et al. |
| 9,213,917 B2 | 12/2015 | Pashintsev et al. |
| 9,216,065 B2 | 12/2015 | Cohen et al. |
| 9,219,753 B2 | 12/2015 | Fleischman et al. |
| 9,223,417 B1 | 12/2015 | Polyakov et al. |
| 9,230,130 B2 | 1/2016 | Peterson et al. |
| 9,235,768 B1 | 1/2016 | Pashintsev et al. |
| 9,251,131 B2 | 2/2016 | McCabe et al. |
| 9,265,458 B2 | 2/2016 | Stack |
| 9,268,758 B2 | 2/2016 | Gonser et al. |
| 9,285,985 B2 | 3/2016 | Lang et al. |
| 9,292,563 B1 | 3/2016 | Engberg et al. |
| 9,292,876 B1 | 3/2016 | Shimkus |
| 9,305,334 B2 | 4/2016 | Barzelay et al. |
| 9,308,052 B2 | 4/2016 | Tolkowsky |
| 9,311,548 B2 | 4/2016 | Constantinou et al. |
| 9,311,549 B2 | 4/2016 | Libin et al. |
| 9,348,836 B2 | 5/2016 | Sachs et al. |
| 9,442,627 B2 | 9/2016 | Sarnoff et al. |
| 9,454,290 B1 | 9/2016 | Ma et al. |
| 9,454,671 B2 | 9/2016 | Engberg et al. |
| 9,460,168 B1 | 10/2016 | Sinclair |
| 9,501,496 B2 | 11/2016 | Constantinou et al. |
| 9,503,402 B2 | 11/2016 | Cue et al. |
| 9,514,117 B2 | 12/2016 | Gonser |
| 9,514,123 B2 | 12/2016 | Goel et al. |
| 9,519,725 B2 | 12/2016 | Libin et al. |
| 9,544,373 B2 | 1/2017 | Poletto et al. |
| 9,558,401 B2 | 1/2017 | Chajed et al. |
| 9,563,783 B2 | 2/2017 | Szebeni et al. |
| 9,576,071 B2 | 2/2017 | Metreveli et al. |
| 9,594,767 B2 | 3/2017 | Victor |
| 9,596,338 B1 | 3/2017 | Fujisaki |
| 9,613,190 B2 | 4/2017 | Ford et al. |
| 9,613,627 B2 | 4/2017 | Park et al. |
| 9,619,485 B2 | 4/2017 | Yamamoto |
| 9,633,013 B2 | 4/2017 | King et al. |
| 9,659,013 B2 | 5/2017 | Wade et al. |
| 9,679,018 B1 | 6/2017 | Yuksel et al. |
| 9,710,523 B2 | 7/2017 | Skurtovich, Jr. et al. |
| 9,710,544 B1 | 7/2017 | Smith et al. |
| 9,710,550 B2 | 7/2017 | Krusell et al. |
| 9,721,002 B2 | 8/2017 | Pfeifer et al. |
| 9,727,548 B2 | 8/2017 | Watanabe |
| 9,727,617 B1 | 8/2017 | Segalis et al. |
| 9,740,771 B2 | 8/2017 | Byron et al. |
| 9,754,021 B2 | 9/2017 | Byron et al. |
| 9,760,570 B2 | 9/2017 | Laroco, Jr. et al. |
| 9,772,996 B2 | 9/2017 | Sheafer et al. |
| 9,785,696 B1 | 10/2017 | Yakhnenko et al. |
| 9,794,766 B2 | 10/2017 | Dua et al. |
| 9,798,787 B1 | 10/2017 | Beard et al. |
| 9,805,004 B2 | 10/2017 | Myers et al. |
| 9,805,338 B1 | 10/2017 | Ghosn et al. |
| 9,817,806 B1 | 11/2017 | Avery et al. |
| 9,830,381 B2 | 11/2017 | Fan et al. |
| 9,830,390 B2 | 11/2017 | Hong et al. |
| 9,836,453 B2 | 12/2017 | Radford et al. |
| 9,870,423 B1 | 1/2018 | Bousquet et al. |
| 9,875,306 B2 | 1/2018 | Cierniak |
| 9,886,430 B2 | 2/2018 | Patten et al. |
| 9,892,465 B2 | 2/2018 | Love et al. |
| 9,898,372 B2 | 2/2018 | Brewer et al. |
| 9,898,463 B2 | 2/2018 | Toyama |
| 9,904,497 B2 | 2/2018 | Eda et al. |
| 2002/0038290 A1 | 3/2002 | Cochran et al. |
| 2002/0038318 A1 | 3/2002 | Cochran et al. |
| 2002/0082943 A1 | 6/2002 | Ibe |
| 2002/0089825 A1 | 7/2002 | Sasaki et al. |
| 2002/0149630 A1 | 10/2002 | Kitainik et al. |
| 2002/0150297 A1 | 10/2002 | Gorbatov et al. |
| 2002/0152240 A1 | 10/2002 | Kitainik et al. |
| 2002/0184160 A1 | 12/2002 | Tadayon et al. |
| 2002/0184517 A1 | 12/2002 | Tadayon et al. |
| 2003/0023387 A1 | 1/2003 | Gill-Garrison et al. |
| 2003/0088786 A1* | 5/2003 | Moran .............. G06F 21/6218 726/4 |
| 2003/0172006 A1 | 9/2003 | Fino et al. |
| 2004/0047506 A1 | 3/2004 | Gorbatov et al. |
| 2004/0109607 A1 | 6/2004 | Gorbatov et al. |
| 2004/0165777 A1 | 8/2004 | Lossev et al. |
| 2004/0213455 A1 | 10/2004 | Lossev et al. |
| 2004/0225884 A1 | 11/2004 | Lorenzini et al. |
| 2005/0244058 A1 | 11/2005 | Gorbatov et al. |
| 2006/0294578 A1* | 12/2006 | Burke .................. G06F 21/604 726/2 |
| 2008/0052196 A1 | 2/2008 | Fino et al. |
| 2008/0209313 A1 | 8/2008 | Gonser |

(56) References Cited

U.S. PATENT DOCUMENTS

| | | |
|---|---|---|
| 2008/0275912 A1 | 11/2008 | Roberts et al. |
| 2009/0024912 A1 | 1/2009 | McCabe et al. |
| 2009/0292786 A1 | 11/2009 | McCabe et al. |
| 2010/0145911 A1 | 6/2010 | Germer et al. |
| 2010/0157041 A1 | 6/2010 | Klaiman et al. |
| 2010/0160764 A1 | 6/2010 | Steinberg et al. |
| 2010/0160773 A1 | 6/2010 | Cohen et al. |
| 2010/0161022 A1 | 6/2010 | Tolkowsky |
| 2010/0161023 A1 | 6/2010 | Cohen et al. |
| 2010/0171819 A1 | 7/2010 | Tolkowsky et al. |
| 2010/0191102 A1 | 7/2010 | Steinberg et al. |
| 2010/0220917 A1 | 9/2010 | Steinberg et al. |
| 2010/0222671 A1 | 9/2010 | Cohen et al. |
| 2010/0225403 A1 | 9/2010 | Boroditsky et al. |
| 2010/0228076 A1 | 9/2010 | Blank et al. |
| 2010/0250433 A1 | 9/2010 | Shivers et al. |
| 2010/0287260 A1 | 11/2010 | Peterson et al. |
| 2010/0290693 A1 | 11/2010 | Cohen et al. |
| 2011/0022536 A1 | 1/2011 | Shivers et al. |
| 2011/0047147 A1 | 2/2011 | Shivers et al. |
| 2011/0068839 A1 | 3/2011 | Boroditsky et al. |
| 2011/0196799 A1 | 8/2011 | Fino et al. |
| 2011/0218912 A1 | 9/2011 | Shivers et al. |
| 2011/0276875 A1 | 11/2011 | McCabe et al. |
| 2011/0314371 A1 | 12/2011 | Peterson et al. |
| 2012/0059811 A1 | 3/2012 | Libin et al. |
| 2012/0060098 A1 | 3/2012 | Libin et al. |
| 2012/0191728 A1 | 7/2012 | Libin et al. |
| 2012/0230565 A1 | 9/2012 | Steinberg et al. |
| 2012/0233044 A1 | 9/2012 | Burger et al. |
| 2013/0019156 A1 | 1/2013 | Gonser et al. |
| 2013/0019289 A1 | 1/2013 | Gonser et al. |
| 2013/0117089 A1 | 5/2013 | Pachikov et al. |
| 2013/0124513 A1 | 5/2013 | Bignert et al. |
| 2013/0159720 A1 | 6/2013 | Gonser et al. |
| 2013/0173727 A1 | 7/2013 | Libin et al. |
| 2013/0174031 A1 | 7/2013 | Constantinou |
| 2013/0212463 A1 | 8/2013 | Pachikov et al. |
| 2013/0226833 A1 | 8/2013 | Allison et al. |
| 2013/0234929 A1 | 9/2013 | Libin |
| 2013/0254111 A1 | 9/2013 | Gonser et al. |
| 2013/0263283 A1 | 10/2013 | Peterson et al. |
| 2013/0307829 A1 | 11/2013 | Libin |
| 2013/0307861 A1 | 11/2013 | Lang et al. |
| 2013/0318063 A1 | 11/2013 | Ayzenshtat et al. |
| 2013/0329030 A1 | 12/2013 | Tolkowsky et al. |
| 2013/0329977 A1 | 12/2013 | Tolkowsky et al. |
| 2014/0006352 A1 | 1/2014 | Sachs et al. |
| 2014/0007005 A1 | 1/2014 | Libin et al. |
| 2014/0029859 A1 | 1/2014 | Libin |
| 2014/0032554 A1 | 1/2014 | Constantinou et al. |
| 2014/0050396 A1 | 2/2014 | Libin et al. |
| 2014/0050398 A1 | 2/2014 | Pashintsev et al. |
| 2014/0050409 A1 | 2/2014 | Constantinou et al. |
| 2014/0094689 A1 | 4/2014 | Cohen et al. |
| 2014/0094690 A1 | 4/2014 | Tolkowsky et al. |
| 2014/0094691 A1 | 4/2014 | Steinberg et al. |
| 2014/0094692 A1 | 4/2014 | Tolkowsky et al. |
| 2014/0094693 A1 | 4/2014 | Cohen et al. |
| 2014/0100451 A1 | 4/2014 | Tolkowsky et al. |
| 2014/0107479 A1 | 4/2014 | Klaiman et al. |
| 2014/0108382 A1 | 4/2014 | Garg et al. |
| 2014/0111541 A1 | 4/2014 | Tolkowsky et al. |
| 2014/0112539 A1 | 4/2014 | Tolkowsky et al. |
| 2014/0112566 A1 | 4/2014 | Steinberg et al. |
| 2014/0114184 A1 | 4/2014 | Klaiman et al. |
| 2014/0114185 A1 | 4/2014 | Tolkowsky et al. |
| 2014/0121513 A1 | 5/2014 | Tolkowsky et al. |
| 2014/0140597 A1 | 5/2014 | Barzelay et al. |
| 2014/0154650 A1 | 6/2014 | Stack |
| 2014/0157110 A1 | 6/2014 | Abbott, Jr. et al. |
| 2014/0161331 A1 | 6/2014 | Cohen et al. |
| 2014/0164542 A1 | 6/2014 | McCabe et al. |
| 2014/0181213 A1 | 6/2014 | Hunter et al. |
| 2014/0208418 A1 | 7/2014 | Libin |
| 2014/0250491 A1 | 9/2014 | Fleischman et al. |
| 2014/0304249 A1 | 10/2014 | Ayzenshtat et al. |
| 2014/0304518 A1 | 10/2014 | Gonser et al. |
| 2014/0330900 A1 | 11/2014 | Libin et al. |
| 2014/0342327 A1 | 11/2014 | Stack |
| 2014/0358613 A1 | 12/2014 | Libin |
| 2014/0359291 A1 | 12/2014 | Wilson et al. |
| 2014/0363796 A1 | 12/2014 | Stack |
| 2014/0380232 A1 | 12/2014 | Sarnoff et al. |
| 2015/0012488 A1 | 1/2015 | van Rossum |
| 2015/0012565 A1 | 1/2015 | Engberg et al. |
| 2015/0033102 A1 | 1/2015 | Losvik et al. |
| 2015/0046287 A1 | 2/2015 | Libin |
| 2015/0046367 A1 | 2/2015 | Libin et al. |
| 2015/0046370 A1 | 2/2015 | Libin et al. |
| 2015/0067464 A1 | 3/2015 | McCabe et al. |
| 2015/0067489 A1 | 3/2015 | Zotto et al. |
| 2015/0071549 A1 | 3/2015 | Chajed et al. |
| 2015/0074044 A1 | 3/2015 | Metreveli et al. |
| 2015/0074776 A1 | 3/2015 | Gonser et al. |
| 2015/0081601 A1 | 3/2015 | Ayzenshtat et al. |
| 2015/0082453 A1 | 3/2015 | Wang et al. |
| 2015/0088574 A1 | 3/2015 | Libin et al. |
| 2015/0121298 A1 | 4/2015 | Ma |
| 2015/0130703 A1 | 5/2015 | Ghajar |
| 2015/0134614 A1 | 5/2015 | Sachs et al. |
| 2015/0143218 A1 | 5/2015 | Peterson et al. |
| 2015/0143219 A1 | 5/2015 | McCabe et al. |
| 2015/0150090 A1 | 5/2015 | Carroll et al. |
| 2015/0161409 A1 | 6/2015 | Szebeni et al. |
| 2015/0169946 A1 | 6/2015 | Needleman |
| 2015/0180984 A1 | 6/2015 | Poletto et al. |
| 2015/0208975 A1 | 7/2015 | Ghajar |
| 2015/0242116 A1 | 8/2015 | Lang et al. |
| 2015/0244833 A1 | 8/2015 | Grue et al. |
| 2015/0254783 A1 | 9/2015 | Levin et al. |
| 2015/0254794 A1 | 9/2015 | Levin et al. |
| 2015/0254795 A1 | 9/2015 | Levin et al. |
| 2015/0282889 A1 | 10/2015 | Cohen et al. |
| 2015/0296012 A1 | 10/2015 | Piyush et al. |
| 2015/0302524 A1 | 10/2015 | Allison et al. |
| 2016/0012287 A1 | 1/2016 | Chajed et al. |
| 2016/0035053 A1 | 2/2016 | Gerhardt |
| 2016/0050177 A1 | 2/2016 | Cue et al. |
| 2016/0055143 A1 | 2/2016 | Goel et al. |
| 2016/0055185 A1 | 2/2016 | Goel et al. |
| 2016/0055188 A1 | 2/2016 | Goel et al. |
| 2016/0055248 A1 | 2/2016 | Goel et al. |
| 2016/0080426 A1 | 3/2016 | Fleischman et al. |
| 2016/0085421 A1 | 3/2016 | Feeney |
| 2016/0125842 A1 | 5/2016 | Weinberg et al. |
| 2016/0127337 A1 | 5/2016 | Fleischman et al. |
| 2016/0127384 A1 | 5/2016 | VoBa |
| 2016/0140101 A1 | 5/2016 | Gosner, Jr. et al. |
| 2016/0170950 A1 | 6/2016 | Malden |
| 2016/0171626 A1 | 6/2016 | Shimkus |
| 2016/0182465 A1 | 6/2016 | Lm et al. |
| 2016/0224517 A1 | 8/2016 | Horn et al. |
| 2016/0224523 A1 | 8/2016 | Shimkus |
| 2016/0224526 A1 | 8/2016 | Gazit et al. |
| 2016/0239471 A1 | 8/2016 | Shimkus |
| 2016/0269377 A1* | 9/2016 | Ylonen .................. H04L 63/08 |
| 2016/0292443 A1 | 10/2016 | von Muhlen et al. |
| 2016/0378629 A1 | 12/2016 | Gwozdz |
| 2017/0011084 A1 | 1/2017 | Goel et al. |
| 2017/0032523 A1 | 2/2017 | Klaiman et al. |
| 2017/0039180 A1 | 2/2017 | Pruitt et al. |
| 2017/0083214 A1 | 3/2017 | Furesj et al. |
| 2017/0091172 A1 | 3/2017 | Takeuchi et al. |
| 2017/0091319 A1 | 3/2017 | Legrand et al. |
| 2017/0093870 A1 | 3/2017 | Meyer |
| 2017/0123606 A1 | 5/2017 | Yamauchi |
| 2017/0123630 A1 | 5/2017 | Yamauchi |
| 2017/0124075 A1 | 5/2017 | Deng |
| 2017/0132219 A1 | 5/2017 | Deng |
| 2017/0140219 A1 | 5/2017 | King et al. |
| 2017/0142076 A1 | 5/2017 | Ford et al. |
| 2017/0177180 A1 | 6/2017 | Bachmann et al. |
| 2017/0177579 A1 | 6/2017 | Li et al. |

(56) References Cited

U.S. PATENT DOCUMENTS

| | | |
|---|---|---|
| 2017/0193469 A1 | 7/2017 | Hernandez |
| 2017/0206559 A1 | 7/2017 | Bakshi et al. |
| 2017/0212899 A1 | 7/2017 | Lightner et al. |
| 2017/0220813 A1 | 8/2017 | Mullins et al. |
| 2017/0228356 A1 | 8/2017 | Kee et al. |
| 2017/0228564 A1 | 8/2017 | Bendet |
| 2017/0235727 A1 | 8/2017 | Kee et al. |
| 2017/0235757 A1 | 8/2017 | Kee et al. |
| 2017/0235786 A9 | 8/2017 | Faith et al. |
| 2017/0236130 A1 | 8/2017 | Kee et al. |
| 2017/0255694 A1 | 9/2017 | Byron et al. |
| 2017/0270537 A1 | 9/2017 | Papa et al. |
| 2017/0277856 A1 | 9/2017 | De La Torre et al. |
| 2017/0286535 A1 | 10/2017 | Krusell et al. |
| 2017/0293682 A1 | 10/2017 | Pfeifer et al. |
| 2017/0300461 A1 | 10/2017 | Mital et al. |
| 2017/0300565 A1 | 10/2017 | Calapodescu et al. |
| 2017/0300960 A1 | 10/2017 | Khvostov et al. |
| 2017/0308538 A1 | 10/2017 | Senjalia |
| 2017/0315997 A1 | 11/2017 | Lee et al. |
| 2017/0316100 A1 | 11/2017 | Li |
| 2017/0322941 A1 | 11/2017 | Giblin et al. |
| 2017/0323157 A1 | 11/2017 | Guzman et al. |
| 2017/0337262 A1 | 11/2017 | Smith et al. |
| 2017/0339471 A1 | 11/2017 | Fisher et al. |
| 2017/0344247 A1 | 11/2017 | Lee et al. |
| 2017/0351749 A1 | 12/2017 | Quirk et al. |
| 2017/0371910 A1 | 12/2017 | Joo et al. |
| 2018/0004822 A1 | 1/2018 | Mulder et al. |
| 2018/0004825 A1 | 1/2018 | Beard et al. |
| 2018/0011827 A1 | 1/2018 | Avery et al. |
| 2018/0020121 A1 | 1/2018 | Riedel et al. |
| 2018/0032493 A1 | 2/2018 | Raleigh et al. |
| 2018/0032803 A1 | 2/2018 | Kochura et al. |
| 2018/0033002 A1 | 2/2018 | Weiss et al. |
| 2018/0039701 A1 | 2/2018 | Pemble et al. |
| 2018/0039889 A1 | 2/2018 | Nanavati et al. |
| 2018/0046623 A1 | 2/2018 | Faith et al. |
| 2018/0046717 A1 | 2/2018 | Hong et al. |
| 2018/0053190 A1 | 2/2018 | Gurunathan et al. |
| 2018/0060445 A1 | 3/2018 | Sanan et al. |

OTHER PUBLICATIONS

Document relating to International Application No. PCT/CA2017/050262, dated May 19, 2017 (International Search Report and Written Opinion).

Extended European Search Report for counterpart European Application No. 17844726.4, dated Mar. 2, 2020.

* cited by examiner

| DOCUMENT MANAGEMENT SYSTEM | Documents | Reminders | Contacts | ⊕ Upload ⊙ Search ④ | Alan Smith |
|---|---|---|---|---|---|
| Contacts Sort By: Last Name/First Name ▼ | | | Search | ♦ Import Contact Card + Add New Contact | |

| NAME | CONTACT INFO | ASSOCIATED DOCUMENTS | SHARED DOCUMENTS |
|---|---|---|---|
| Smith, Alan | alan@mail.com | | 7 |
| Johnson, Brad<br>Example Bank Mortgage Specialist | brad.johnson@ebc.com | 5 | |
| Patton, Cathy<br>Insurance Broker | cpatton@insured.ca | 3 | |

SYSTEMS AND METHODS FOR SHARING DOCUMENTS

CROSS-REFERENCE TO RELATED APPLICATIONS

This application claims the benefit of U.S. Provisional Patent Application No. 62/383,301, filed Sep. 2, 2016, the entire contents of which are incorporated herein by reference.

FIELD

The described embodiments relate to methods and systems for sharing documents and in particular, for sharing documents with delegates.

BACKGROUND

In comparison to physical documents, electronic documents can be more portable and require less physical storage space. Electronic documents can also be easily modified, duplicated and disseminated.

However, the convenience of electronic documents can result in other limitations. The ease with which electronic documents can be duplicated and shared with others, for example, heightens the need for proper security safeguards. Also, since electronic documents can be created fairly easily and with minimal expense, the resulting volume of electronic documents that need to be managed can be fairly significant.

SUMMARY

The various embodiments described herein generally relate to methods (and associated systems configured to implement the methods) for sharing a plurality of documents.

In accordance with some embodiments, there is provided a method for sharing a plurality of electronic documents. The method includes: storing the plurality of electronic documents in a relational database storage; storing a plurality of entity identifiers in the relational database storage, each entity identifier representing an entity type selected from a plurality of entity types; recording in a non-relational database storage a plurality of associations between the plurality of electronic documents and at least one entity identifier from the plurality of entity identifiers, each association comprising a relationship between a set of electronic documents from the plurality of electronic documents and the at least one entity identifier; associating a delegate account with the at least one entity identifier; and based on an association recorded in the non-relational database storage for the at least one entity identifier, granting the delegate account a subset of document management functions from a set of document management functions available for the set of documents.

In some embodiments, each association includes a definition of the subset of document management functions for the set of documents and the at least one entity identifier.

In some embodiments, the set of document management functions includes at least one of a modification function, a download function and a share function.

In some embodiments, the delegate account is associated with a first set of documents and a second set of documents that is different from the first set of documents, and granting the delegate account the subset of document management functions includes: determining a first association between the first set of electronic documents and the at least one entity identifier; determining a second association between the second set of electronic documents and the at least one entity identifier; and granting the delegate account a first subset of document management functions for the first set of electronic documents based on the first association, and a second subset of document management functions for the second set of documents based on the second association.

In some embodiments, the first subset of electronic document management functions is different from the second subset of document management functions.

In some embodiments, the subset of electronic document management functions includes a conditional access to the set of documents, the conditional access indicating access to the set of documents is contingent on an occurrence of an event defined by an owner of the set of documents.

In some embodiments, for the set of documents, the non-relational database storage includes a first association and a second association that is different from the first association; and the method includes associating a first delegate account with a first entity identifier in the first association and a second delegate account with a second entity identifier in the second association, the second delegate account being different from the first delegate account.

In some embodiments, the set of documents includes one or more documents.

In some embodiments, the relational database storage includes one or more relational databases organized based on a relational model.

In some embodiments, the non-relational database storage includes one or more non-relational databases organized based on a non-relational model.

In accordance with an embodiment, there is provided a system for sharing a plurality of documents. The system includes: a relational database storage for storing, at least: the plurality of documents; and a plurality of entity identifiers, each entity identifier representing an entity type selected from a plurality of entity types; a non-relational database storage for recording a plurality of associations between the plurality of documents and at least one entity identifier from the plurality of entity identifiers, each association comprising a relationship between a set of documents from the plurality of documents and the at least one entity identifier; and a documents manager operable to access each of the relational database storage and the non-relational database storage via a network, the documents manager comprising a processor operable to: associate a delegate account with the at least one entity identifier; and based on an association recorded in the non-relational database storage for the at least one entity identifier, granting the delegate account a subset of document management functions from a set of document management functions available for the set of documents.

In some embodiments, each association includes a definition of the subset of document management functions for the set of documents and the at least one entity identifier.

In some embodiments, the set of document management functions include at least one of a modification function, a download function and a share function.

In some embodiments, the delegate account is associated with a first set of documents and a second set of documents that is different from the first set of documents, and the documents manager operates to: determine a first association between the first set of documents and the at least one entity identifier; determine a second association between the second set of documents and the at least one entity identifier;

and grant the delegate account a first subset of document management functions for the first set of documents based on the first association, and a second subset of document management functions for the second set of documents based on the second association.

In some embodiments, the first subset of document management functions is different from the second subset of document management functions.

In some embodiments, the subset of document management functions comprises a conditional access to the set of documents, the conditional access indicating access to the set of documents is contingent on an occurrence of an event defined by an owner of the set of documents.

In some embodiments, for the set of documents, the non-relational database storage comprises a first association and a second association that is different from the first association; and the documents manager associates a first delegate account with a first entity identifier in the first association and a second delegate account with a second entity identifier in the second association, the second delegate account being different from the first delegate account.

In some embodiments, the set of documents includes one or more documents.

In some embodiments, the relational database storage includes one or more relational databases organized based on a relational model.

In some embodiments, the non-relational database storage includes one or more non-relational databases organized based on a non-relational model.

BRIEF DESCRIPTION OF THE DRAWINGS

Several embodiments will now be described in detail with reference to the drawings, in which:

FIG. 3 is a screenshot of an example contact list in accordance with an example embodiment;

FIG. 4 is a screenshot of an example entity selection interface in accordance with an example embodiment;

Figure 1:
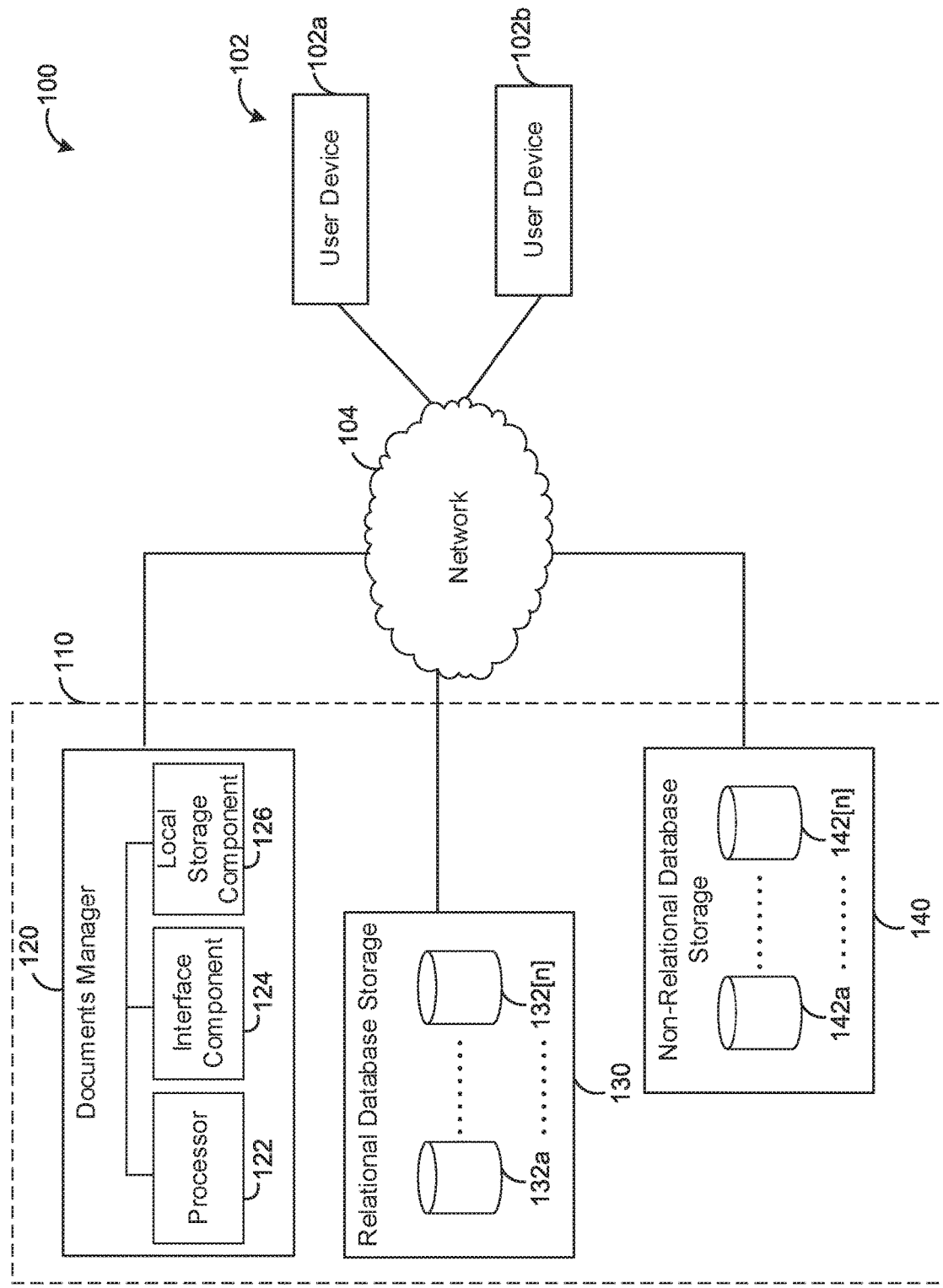
FIG. 1 is a block diagram of components interacting with a documents management system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity.

DESCRIPTION OF EXEMPLARY EMBODIMENTS

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like.

The computer useable instructions may also be in various forms, including compiled and non-compiled code.

Electronic documents can be fairly easy to create and modify, and shared with others. The convenience of electronic documents increases the need for electronic document management systems that can facilitate sharing of electronic documents in a secured and convenient manner, particularly in situations in which multiple entities require access to the electronic documents.

In the methods and systems described herein, electronic documents can be shared with different entities, and those entities can be allowed to perform different actions in respect of those electronic documents depending on their entity type. These entities can act as delegates, or trusted advisors, of those electronic documents and are granted different degrees of responsibility for those electronic documents.

Each set of electronic documents is associated with one or more different entity types, and each entity type is granted a set of document management functions that allow that entity to perform certain actions in respect of those electronic documents. An originator of the electronic documents, or a delegate, can assign the different levels of responsibility in respect of the electronic documents to different delegates with relative ease and in a secured manner.

Reference is made to FIG. 1, which illustrates a block diagram 100 of components interacting with a documents management system 110. The documents management system 110 includes a documents manager 120, a relational database storage 130, and a non-relational database storage 140. The documents manager 120 can communicate with each of user devices 102, the relational database storage 130, and the non-relational database storage 140 via a network 104.

Although only one documents management system 110 is shown in FIG. 1, there may be multiple documents management system 110 distributed over a wide geographic area and connected via the network 104.

The documents manager 120 has a processor 122, an interface component 124 and a local storage component 126. Each of the processor 122, the interface component 124 and the local storage component 126 may be implemented in software or hardware, or a combination of software and hardware.

The processor 122 may include one or more processing components with computing processing abilities and memory such as a database(s) or file system(s). Each processing component can be configured to perform different dedicated tasks. The processor 122 may be any suitable processors, controllers or digital signal processors that can provide sufficient processing power depending on the configuration, purposes and requirements of the documents manager 120. The processor 122 may be configured to control the operation of the documents manager 120 based on received data, stored data and/or settings defined by the user or the system, for example.

The interface component 124 may be any interface that enables the documents manager 120 to communicate with other devices and systems via the network 104. In some embodiments, the interface component 124 can include at least one of a serial port, a parallel port, or a USB port. The interface component 124 may also include at least one of an Internet, Local Area Network (LAN), Ethernet, Firewire, modem or digital subscriber line connection. Various combinations of these elements may be incorporated within the interface component 124.

The local storage component 126 can include RAM, ROM, one or more hard drives, one or more flash drives or some other suitable data storage elements such as disk drives, etc. The local storage component 126 may further include one or more databases (not shown) for storing information relating to, for example, user accounts and the documents to be shared.

The processor 122, the interface component 124 and the local storage component 126 may be combined into a fewer number of components, or may be separated into a greater number of components.

The network 104 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between each of the documents manager 120, the user devices 102, the relational database storage 130 and the non-relational database storage 140.

The user devices 102 can be any computing device operable to connect to the network 104 through a wired or wireless connection. As noted, the user devices 102 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. In some embodiments, the user devices 102 may be a laptop, or a smartphone device equipped with a network adapter for connecting to the Internet. In some embodiments, the connection request initiated from the user devices 102 may be initiated from a web browser and directed at the browser-based communications application supported by the documents manager 120.

Although only user devices 102a, 102b are shown in FIG. 1, it will be understood that more user devices 102 can be in communication with each of the documents manager 120, the relational database storage 130 and the non-relational database storage 140 at any one time.

The user devices 102 can be operated by any user of the documents management system 110. For example, the user device 102a can be operated by an owner of a document to upload the document to the relational database storage 130 and to define the corresponding document management functions for the different entities that can access that document. The user device 102b can be operated by a delegate associated with an entity type granted access to that document.

The relational database storage 130 is a database computer (or computers) hosting one or more relational databases, such as 132a to 132[n], organized based on a relational model. Relational databases 132 have a table structure with each row corresponding to a unique set of data, and each column containing a characteristic of that set of data. Each row of the relational database 132 has a defined set of columns.

The relational database storage 130 stores a plurality of electronic documents provided by users of the documents management system 110. The relational database storage 130 can also store data related to characteristics of the stored documents, such as document identifiers. In some embodiments, the electronic documents stored in the relational database storage 130 can be structured as a file directory system with one or more folder levels and subfolder levels as described further herein. Each folder level can be assigned a category and each subfolder level can be assigned a subcategory.

The relational database storage 130 also stores a plurality of entity identifiers that represent different entity types. Each entity type can identify a delegate that can be assigned responsibility for a set of documents. For example, a delegate can be a mortgage broker who can be assigned responsibility for a mortgage application and related conveyance documents related to the real estate transaction. Other delegates can include insurance brokers, accountants, lawyers, wealth advisors, trustees, and other professionals. In some embodiments, the delegate can include personal acquaintances and family members.

The number of relational databases 132 provided in the relational database storage 130 can vary with the requirements of the documents management system 110, such as a size of the documents and number of users, for example.

The user providing a document can be an owner of the document and/or a delegate of the document or related documents. The documents can include various types, such as personal documents (e.g., bank statements, tax forms, wills, etc.), transaction-related documents (e.g., documents for completing a mortgage application, etc.) and other related documents.

The non-relational database storage 140 is a database computer (or computers) hosting one or more non-relational databases, such as 142a to 142[n], organized based on a non-relational model, such as key-value, graph, column, document or other models. Unlike relational databases 132 that have a predefined set of data fields, non-relational databases 142 are not restricted to a set of data fields but can be implemented with more flexible data structures. Non-relational databases 142 can, therefore, be appropriate for storing unstructured data sets and data that needs to be accessed regularly due to a high volume of requests.

In comparison with non-relational databases 142, relational databases 132 can be computationally expensive for more complex data structures. Data structures that involve multiple nested hierarchies, for example, can require recursive calculations to be performed. As a result, there can be significant delays to the retrieval and/or storage of data in relational databases 132. Relational databases 132, therefore, may not be effective when computational speed is critical and the data structure is fairly complex.

The non-relational database storage 140 can store data related to the entity identifiers, the electronic documents, and associations defined for the electronic documents and the entity identifiers. By providing the metadata related to the electronic documents and the entity identifiers in the non-relational database storage 140, the retrieval and/or updating of data related to the electronic documents will not be limited by the computational limitations associated with querying the relational databases 132 directly.

The number of non-relational databases 142 provided in the non-relational database storage 140 can vary with the requirements of the documents management system 110, such as a size of the documents and number of users, for example.

Figure 2:
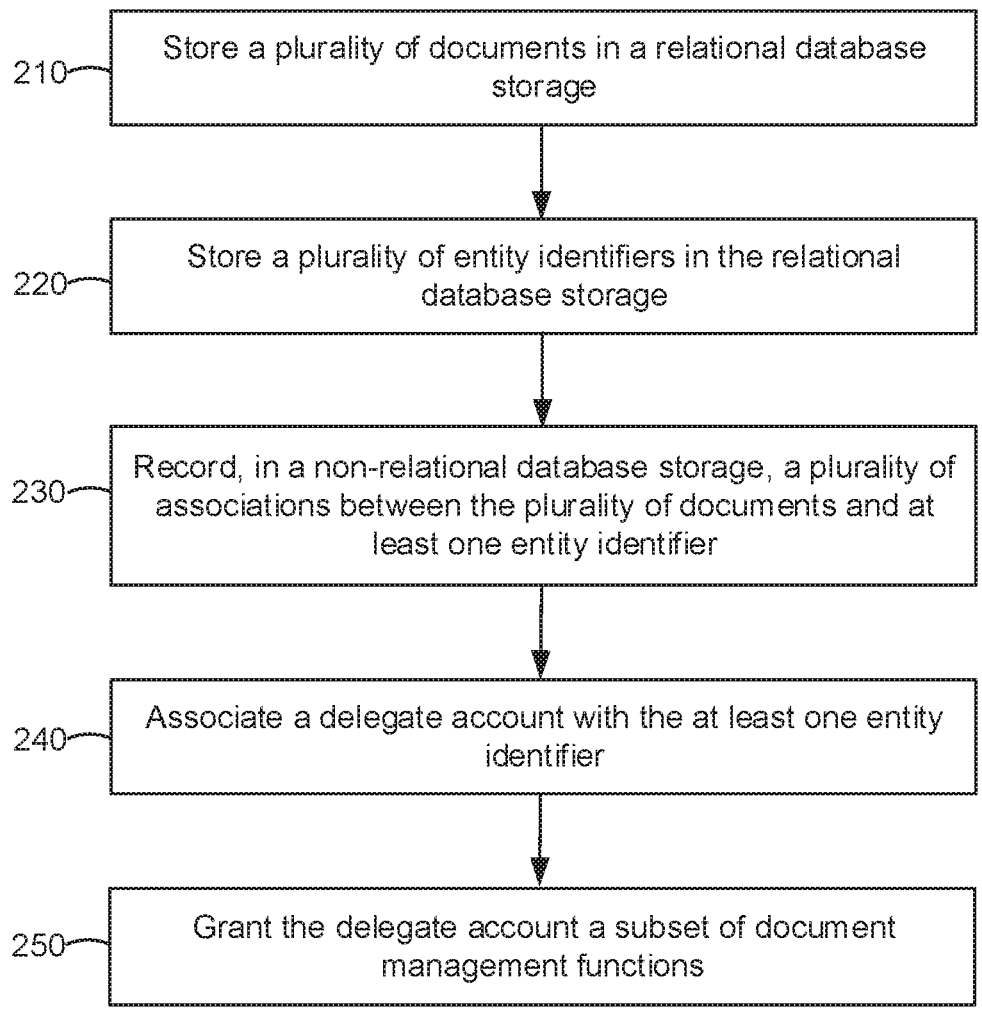
FIG. 2 is a flowchart of an example embodiment of various methods of sharing documents.

Referring now to FIG. 2, which is a flowchart diagram 200 illustrating an example method for sharing documents. To illustrate the example method, reference will be made simultaneously to FIGS. 3 to 6C.

At 210, the documents manager 120 stores a plurality of documents in the relational database storage 130.

The documents management system 110 described herein can be used for storing a variety of documents and for facilitating the sharing of the documents with different entities. Example documents that can be stored in the relational database storage 130 can include various types, such as personal documents (e.g., bank statements, tax forms, wills, etc.), transaction-related documents (e.g., documents for completing a mortgage application, etc.) and other documents.

The documents can be organized into hierarchies in the relational database storage 130. The hierarchies may take the form of folders and subfolders, for example.

At 220, the documents manager 120 stores a plurality of entity identifiers in the relational database storage 130.

A variety of entity identifiers can be stored in the relational database storage 130. The entity identifiers represent an entity type from a plurality of entity types. Each entity type identifies a professional, or a category of individuals, that can be assigned responsibility for a set of documents. The entity identifiers are not associated with specific users of the documents management system 110, but rather, a category of individuals who require, or can be assigned, some degree of access to the electronic documents stored in the relational database storage 130. The degree of access granted to each entity type can vary. Example entity types can include personal assistants, insurance brokers, lawyers, accountants, wealth advisors and other professionals. In some embodiment, an entity type can be personal acquaintances and family members.

The documents manager 120 can generate a notification, and transmit that notification, to the owner of the electronic documents and/or the associated delegate when an electronic document is added to the relational database storage 130.

At 230, the documents manager 120 records in the non-relational database storage 140 a plurality of associations between the electronic documents stored in the relational database storage 130 and at least one entity identifier.

Each association includes a relationship between a set of electronic documents stored in the relational database storage 130 and an entity identifier stored in the relational database storage 130. For example, the association can include a definition of the subset of document management functions for that set of electronic documents and the entity identifier. The set of electronic documents can include one or more electronic documents, as determined by the user defining the document management functions available for each entity identifier. The user defining the document management functions can be the owner of the electronic documents or a delegate assigned with the responsibility of managing the document management functions for those electronic documents.

Depending on the entity identifier and the set of electronic documents, the association defines the degree of access for the delegate who will be associated with that entity identifier in subsequent actions in the system. An example association will be described with reference to FIGS. 3 and 4.

FIG. 3 shows a screenshot 300 of an example contact list 320 for a user 310, Alan Smith. The contact list 320 can be stored in the local storage component 126 or in the relational database storage 130 for the user 310.

The contact list 320 includes a contact 322a, which is the user 310 himself, a contact 322b ("Brad Johnson") with a job title 324a of EBC mortgage specialist, and a contact 322c ("Cathy Patton") with a job title 324b of insurance broker. The user 310 may not need to be included in the contact list 320.

To invite a contact 322 from the contact list 320 to become a delegate, the user 310 associates the contact 322 with one or more entity types in respect of the electronic documents that the user 310 has control. As explained, the user 310 can be the owner of the electronic documents and therefore, have complete access over the electronic documents, or can be a delegate granted complete access to the electronic documents for another individual. In this example, the user 310 is the owner of the electronic documents.

Figure 4:
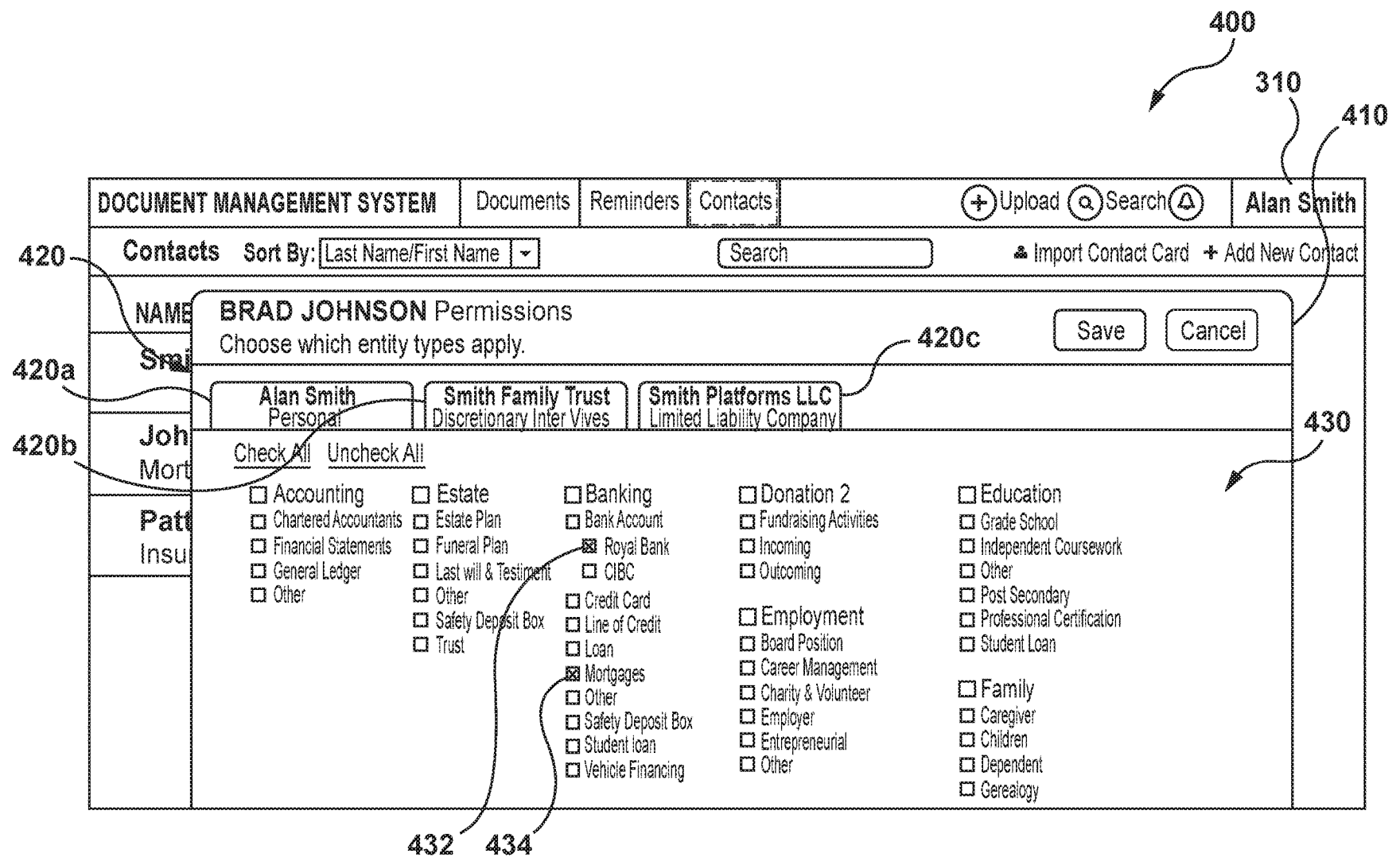

FIG. 4 shows a screenshot 400 of an example entity type selection interface 410. As shown in the entity type selection interface 410, the user 310 owns several sets of documents related to different categories 420, namely a personal category 420a, a family trust category 420b, and a company category 420c. The sets of documents are stored in the relational database storage 130. The entity type selection interface 410 provides a list 430 of entity types from which the user 310 can select for assigning the relevant entity type for each contact 322.

In the example shown in FIG. 4, the user 310 has assigned the contact 322b ("Brad Johnson") with the "Example Bank" entity type 432 and mortgage entity type 434 for the electronic documents stored within the personal category 420a. This is appropriate since the contact 322b ("Brad Johnson") has the job title 324a of EBC mortgage specialist and therefore, should have access to electronic documents related to mortgages and the Example Bank banking account, which is the bank from which the user 310 is seeking a mortgage.

After establishing the association between the set of documents within the personal category 420a with the entity types 432 and 434, the documents manager 120 can generate and deliver a delegate invitation to the contact 322b ("Brad Johnson") to invite him to become a delegate for the user 310.

Figure 5:
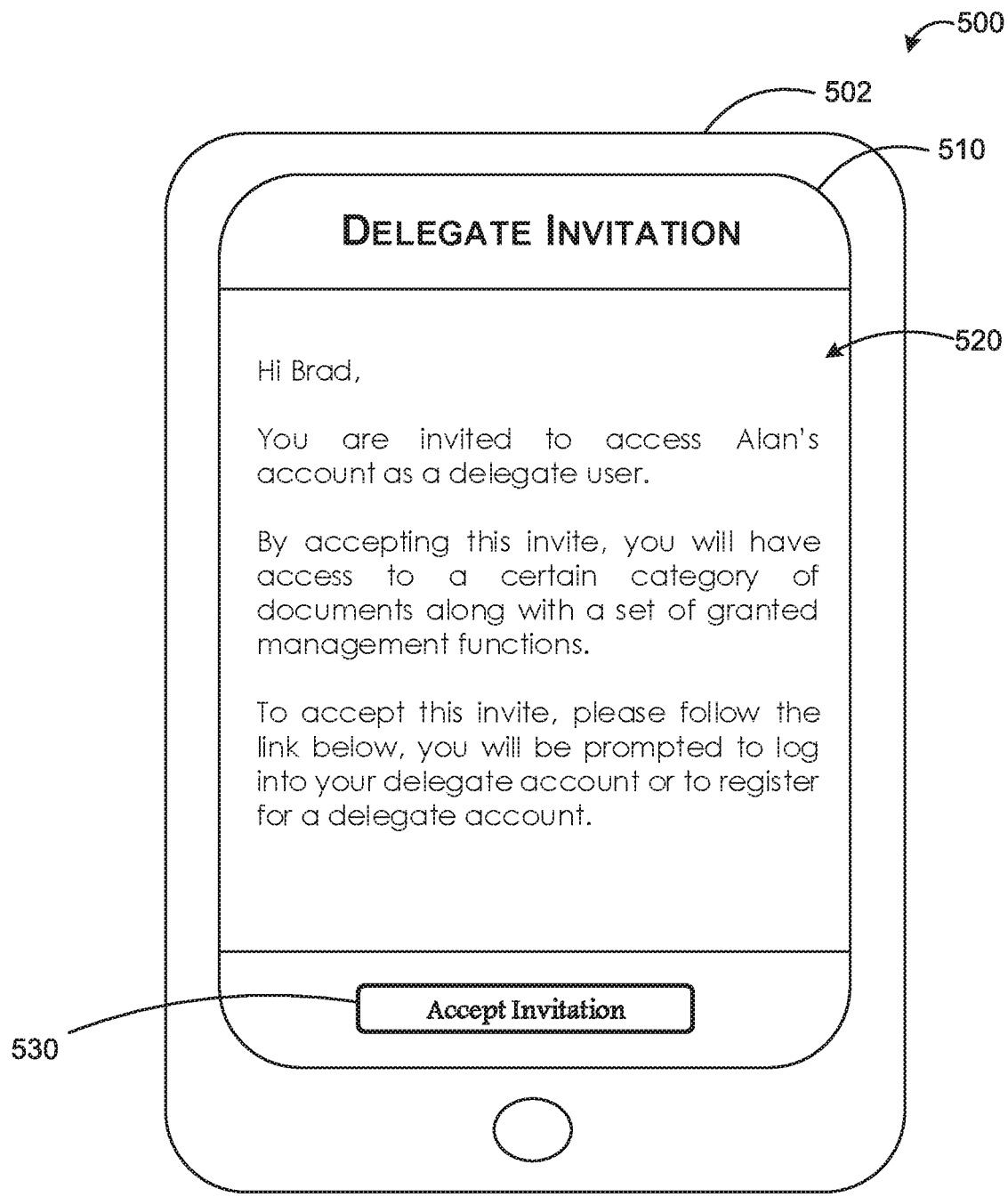
FIG. 5 is an example delegate invitation in accordance with an example embodiment.

FIG. 5 shows an example delegate invitation 500 provided on a display 510 of a user device 502. As shown in FIG. 5, the delegate invitation 500 includes a text field 520 explaining the responsibility of being a delegate and an accept icon 530 for directing the recipient to the documents management system 110 for completing the registration as a delegate.

At 240, the documents manager 120 associates a delegate account with the at least one entity identifier.

Continuing with FIG. 5, the accept icon 530, when selected, directs the recipient of the delegate invitation 500 to a secured acceptance link. The secured acceptance link may be hashed. At the link, the documents manager 120 can complete a registration of a delegate account for the recipient. In this example, the documents manager 120 can associate the delegate account for the contact 322b ("Brad Johnson") with the entity types 432 and 434 for the set of documents within the personal category 420a.

At 250, the documents manager 120 grants the delegate account a subset of document management functions.

As the delegate for the user 310, the delegate account of the contact 322b can be granted various document management functions. A set of document management functions that are available for an electronic document, or a set of electronic documents, can be stored in the relational database storage 130, for example.

For example, the document management functions can include managing the electronic documents or folders (e.g., assigning access permissions to different entity types, organizing the electronic documents, uploading additional electronic documents, and related actions), modifying the electronic documents, viewing the electronic documents, downloading and sharing the electronic documents, creating reminders for the electronic documents, and other related functions.

Another example document management function can be a conditional access to a set of electronic documents. The conditional access can be contingent on an occurrence of an event defined by an owner of the set of electronic documents, such as the user 310, or a delegate associated with the entity type defined for managing the set of electronic documents. For example, estate management documents, such as a will, can be assigned a conditional access. The delegate assigned with the trustee entity type for the estate management documents will not be granted access until the testator is deceased, which can be confirmed with a court order or death certificate, for example.

In some embodiments, only the user 310 can permanently delete the electronic documents from the documents management system 110.

Figure 6A:
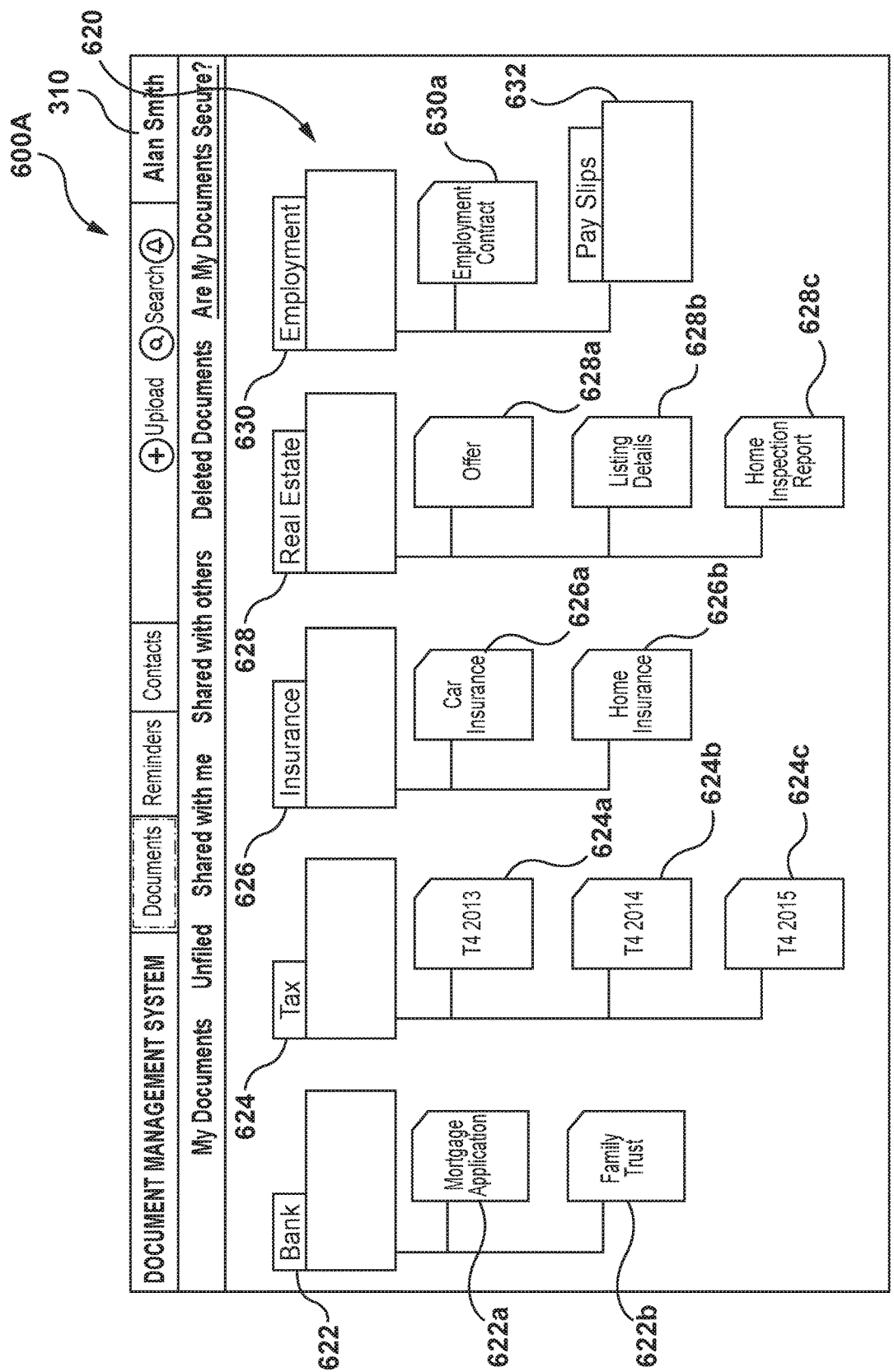
FIG. 6A is a screenshot of an example interface displaying a document directory for a user in accordance with an example embodiment.
Figure 6B:
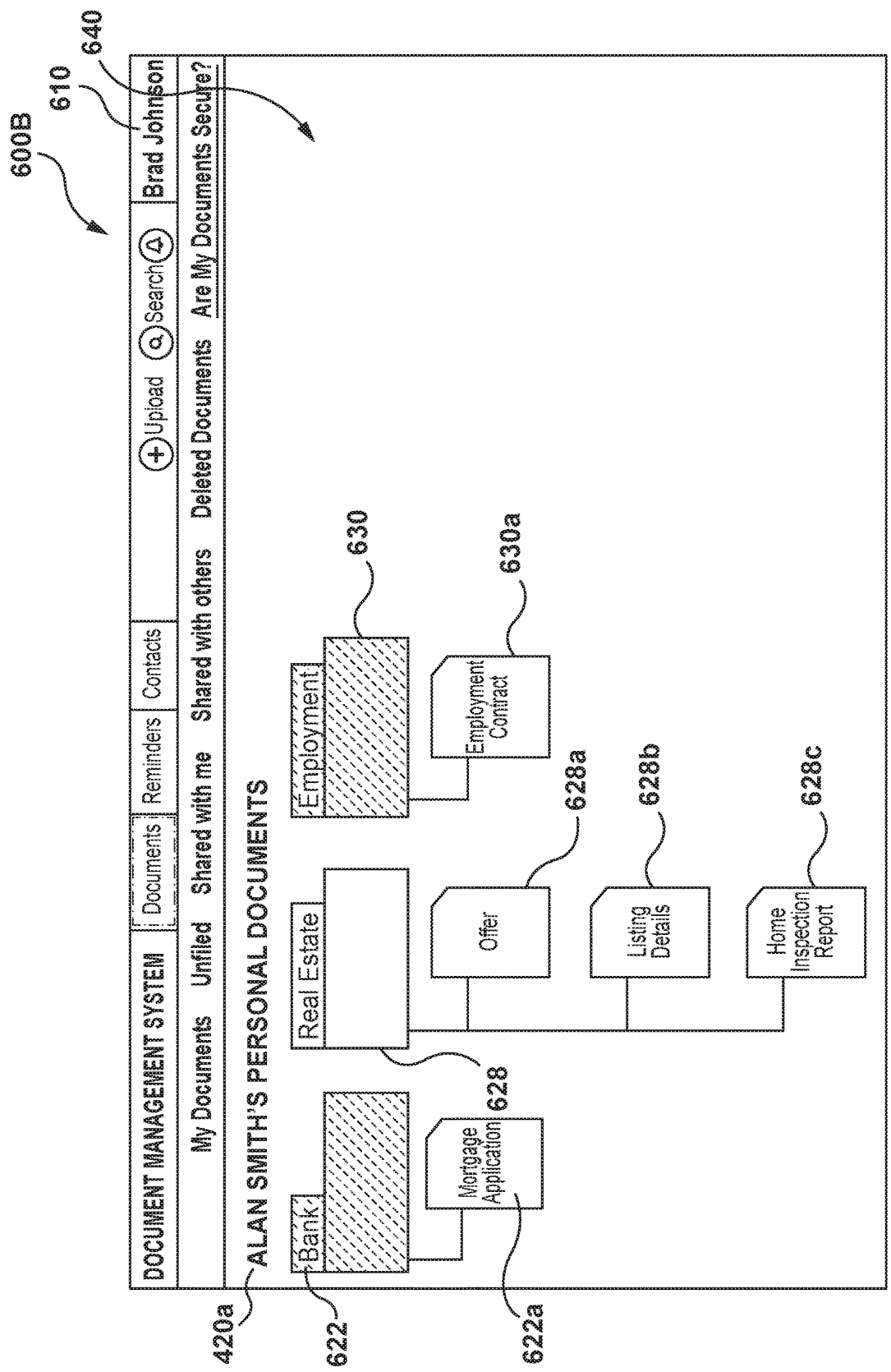
FIG. 6B is a screenshot of an example interface displaying a set of documents from the document directory of FIG. 6A for which a delegate user has access, in accordance with an example embodiment.
Figure 6C:
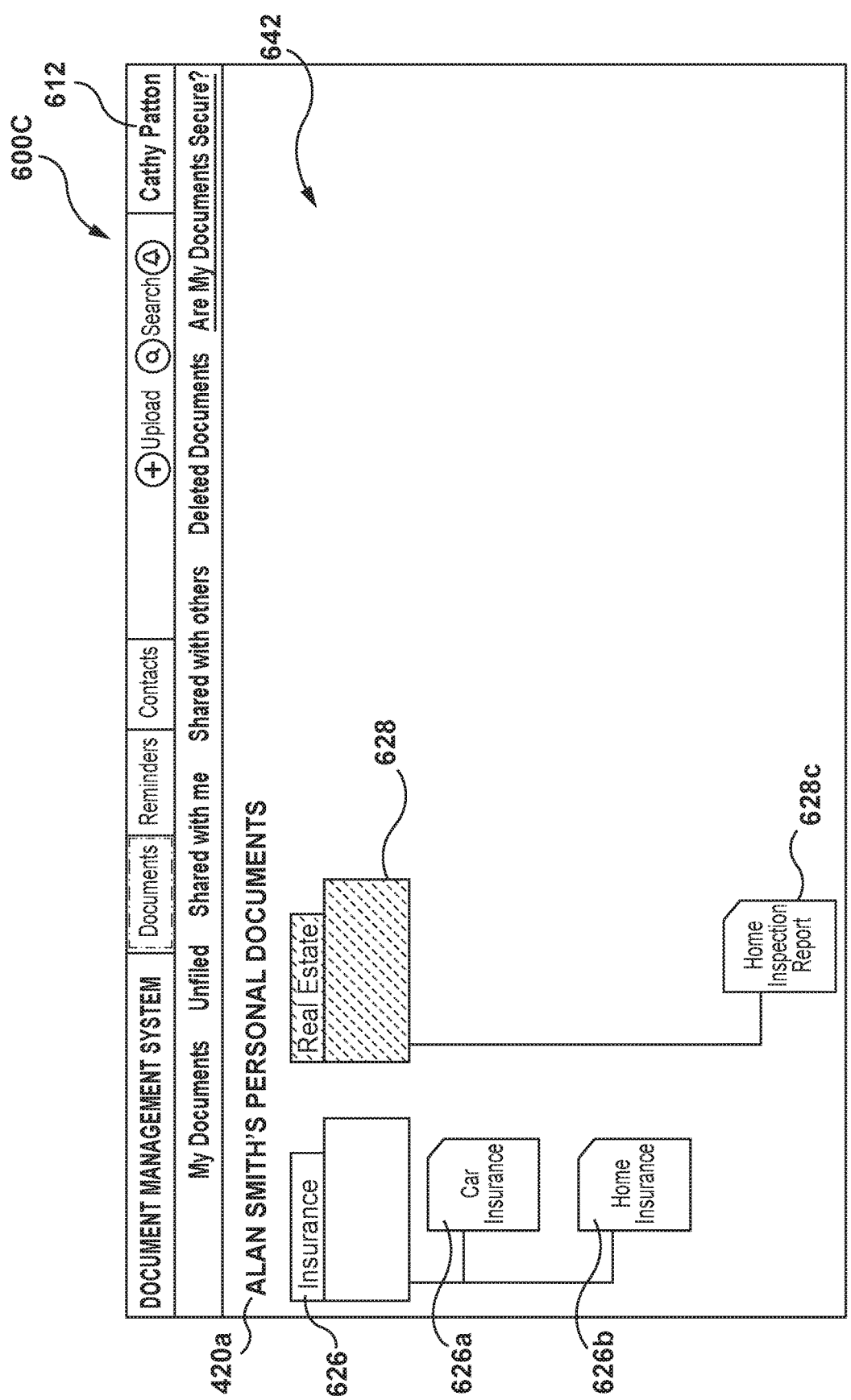
FIG. 6C is a screenshot of another example interface displaying a set of documents from the document directory of FIG. 6A for which another delegate user has access, in accordance with an example embodiment.

Reference will now be made to FIGS. 6A to 6C.

FIG. 6A is a screenshot 600A of an example interface displaying a document directory 620 for the user 310.

The document directory 620 shows the electronic documents stored in the relational database storage 130 for the user 310 organized in a file directory format. It will be understood that other data structures may be used.

The document directory 620 includes five sets of electronic documents 622, 624, 626, 628 and 630. Each set of electronic documents 622, 624, 626, 628 and 630 includes one or more electronic documents and/or subfolders. The set of electronic documents 622 is for a bank category and includes electronic documents 622a and 622b, the set of electronic documents 624 is for a tax category and includes electronic documents 624a, 624b and 624c, the set of electronic documents 626 is for an insurance category and includes electronic documents 626a and 626b, the set of electronic documents 628 is for a real estate category and includes electronic documents 628a, 628b, and 628c, and the set of electronic documents 630 is for an employment category and includes an electronic document 630a and a subfolder 632. The electronic documents within the subfolder 632 are not shown.

Continuing with the example described with respect to FIGS. 3 to 5, FIG. 6B shows a screenshot 600B of an example interface displaying a set of documents 640 for which the delegate 610 has been assigned responsibility by the user 310.

As explained with reference to FIGS. 3 and 4, the contact 322b ("Brad Johnson") is a EBC mortgage specialist, and therefore, the contact 322b is now the delegate 610 associated with the "Example Bank" entity type 432 and mortgage entity type 434 for the electronic documents within the personal category 420a. The electronic documents owned by the user 310 that are associated with the "Example Bank" entity type 432 and mortgage entity type 434 include the electronic document 622a, which is a mortgage application, the set of electronic documents 628 related to the real estate category, namely electronic document 628a ("offer"), 628b ("listing details"), and 628c ("house inspection report), and the electronic document 630a ("employment contract").

It is possible that the electronic documents stored in the relational database storage 130 can have more than one association stored in the non-relational database storage 140. An example is now described with reference to FIG. 6C, which is a screenshot 600C of an example interface displaying a set of electronic documents 642 for which a delegate 612 ("Cathy Patton") has been assigned responsibility by the user 310.

The contact 322c ("Cathy Patton") is an insurance broker. The user 310 has assigned the insurance entity type to the contact 322c. After the contact 322c completed the registration to become the delegate 612 (which can be similar to the description for the contact 322b with reference to FIGS. 4 and 5), the documents manager 120 associates the delegate account of the contact 322c with the insurance entity type and the corresponding set of electronic documents. To grant the corresponding set of document management functions for the delegate account of the delegate 612, the documents manager 120 can determine the association stored in the non-relational database storage 140 for the insurance entity type and the corresponding set of electronic documents within the personal category 420a.

FIG. 6C shows that the set of documents 642 for which the delegate 612 has been granted responsibility includes the set of electronic documents 626 related to the insurance category, namely electronic document 626a ("car insurance") and 626b ("home insurance"), and the electronic document 628c ("home inspection report"). As described with reference to FIG. 6B, the delegate 610 was also granted responsibility of the electronic document 628c ("home inspection report"). The non-relational database storage 140, therefore, includes a first association between the electronic document 628c and each of the "Example Bank" entity type 432 and mortgage entity type 434, and a second association between the electronic document 628c and the insurance entity type.

Since the roles of the delegates 610 and 612 are different, the first and second associations can define different subsets of document management functions for each delegate 610 and 612. For example, the delegate 610 is associated with the "Example Bank" entity type 432 and the mortgage entity type 434, and so, the delegate 610 can be granted document management functions involving reviewing and sharing of the electronic document 628c ("home inspection report") since the delegate 610 may need to share the home inspection report 628c with other finance entities to obtain financing and/or approval for the mortgage application 622a. The delegate 612, in contrast, is associated with the insurance entity type and therefore, may be granted a document management function involving only reviewing of the electronic document 628c ("home inspection report") for finalizing the home insurance document 626b.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Various modification and variations may be made to these exemplary embodiments without departing from the spirit and scope of the invention, which is limited only by the appended claims. Also, in the various user interfaces illustrated in the drawings, it will be understood that the illustrated user interface text and controls are provided as examples only and are not meant to be limiting. Other suitable user interface elements may be possible.

We claim:

1. A method for sharing a plurality of electronic documents, the method comprising:
    storing the plurality of electronic documents in a relational database storage;
    storing a plurality of entity identifiers in the relational database storage, each entity identifier representing an entity type selected from a plurality of entity types, wherein each entity type defines a category of users;
    recording in a non-relational database storage a plurality of associations between the plurality of electronic documents and at least one entity identifier from the plurality of entity identifiers, each association comprising a relationship between a set of electronic documents from the plurality of electronic documents and the at least one entity identifier;
    recording an association between a delegate account and the at least one entity identifier; and
    based on an association recorded in the non-relational database storage for the at least one entity identifier, granting the delegate account a subset of document management functions from a set of document management functions available for the set of documents;
    wherein by storing at least the plurality of entity identifiers in the relational database storage, and recording at least the plurality of associations in the non-relational database storage, the retrieval or updating of data related to the plurality of electronic documents is not limited by computational limitations associated with querying only the relational database.

2. The method of claim 1, wherein each association recorded in the non-relational database storage comprises a definition of the subset of document management functions for the set of documents and the at least one entity identifier.

3. The method of claim 1, wherein the set of document management functions comprise at least one of a modification function, a download function and a share function.

4. The method of claim 1, wherein the delegate account is associated with a first set of documents and a second set of documents that is different from the first set of documents, and
    granting the delegate account the subset of document management functions comprises:
    determining a first association between the first set of electronic documents and the at least one entity identifier;
    determining a second association between the second set of electronic documents and the at least one entity identifier; and
    granting the delegate account a first subset of document management functions for the first set of electronic documents based on the first association, and a second subset of document management functions for the second set of documents based on the second association.

5. The method of claim 4, wherein the first subset of electronic document management functions is different from the second subset of document management functions.

6. The method of claim 1, wherein the subset of electronic document management functions comprises a conditional access to the set of documents, the conditional access indicating access to the set of documents is contingent on an occurrence of an event defined by an owner of the set of documents.

7. The method of claim 1, wherein, for the set of documents, the non-relational database storage comprises a first association and a second association that is different from the first association; and
the method comprises associating a first delegate account with a first entity identifier in the first association and a second delegate account with a second entity identifier in the second association, the second delegate account being different from the first delegate account.

8. The method of claim 1, wherein the set of documents comprises one or more documents.

9. The method of claim 1, wherein the relational database storage comprises one or more relational databases organized based on a relational model.

10. The method of claim 1, wherein the non-relational database storage comprises one or more non-relational databases organized based on a non-relational model.

11. A system for sharing a plurality of documents, the system comprising:
a relational database storage for storing, at least:
the plurality of documents; and
a plurality of entity identifiers, each entity identifier representing an entity type selected from a plurality of entity types, wherein each entity type defines a category of users;
a non-relational database storage for recording a plurality of associations between the plurality of documents and at least one entity identifier from the plurality of entity identifiers, each association comprising a relationship between a set of documents from the plurality of documents and the at least one entity identifier; and
a processor communicatively coupled to the relational database storage and the non-relational database storage via a network, the processor configured to:
associate a delegate account with the at least one entity identifier; and
based on an association recorded in the non-relational database storage for the at least one entity identifier, grant the delegate account a subset of document management functions from a set of document management functions available for the set of documents,
wherein by storing at least the plurality of entity identifiers in the relational database storage, and recording at least the plurality of associations in the non-relational database storage, the retrieval or updating of data related to the plurality of electronic documents is not limited by computational limitations associated with querying only the relational database.

12. The system of claim 11, wherein each association recorded in the non-relational database storage comprises a definition of the subset of document management functions for the set of documents and the at least one entity identifier.

13. The system of claim 11, wherein the set of document management functions comprise at least one of a modification function, a download function and a share function.

14. The system of claim 11, wherein the delegate account is associated with a first set of documents and a second set of documents that is different from the first set of documents, and
the processor is further configured to:
determine a first association between the first set of documents and the at least one entity identifier;
determine a second association between the second set of documents and the at least one entity identifier; and
grant the delegate account a first subset of document management functions for the first set of documents based on the first association, and a second subset of document management functions for the second set of documents based on the second association.

15. The system of claim 14, wherein the first subset of document management functions is different from the second subset of document management functions.

16. The system of claim 11, wherein the subset of document management functions comprises a conditional access to the set of documents, the conditional access indicating access to the set of documents is contingent on an occurrence of an event defined by an owner of the set of documents.

17. The system of claim 11, wherein, for the set of documents, the non-relational database storage comprises a first association and a second association that is different from the first association; and
the processor is configured to associate a first delegate account with a first entity identifier in the first association and a second delegate account with a second entity identifier in the second association, the second delegate account being different from the first delegate account.

18. The system of claim 11, wherein the set of documents comprises one or more documents.

19. The system of claim 11, wherein the relational database storage comprises one or more relational databases organized based on a relational model.

20. The system of claim 11, wherein the non-relational database storage comprises one or more non-relational databases organized based on a non-relational model.

* * * * *